(12) United States Patent
Futamata et al.

(10) Patent No.: US 10,926,718 B2
(45) Date of Patent: Feb. 23, 2021

(54) SADDLE RIDING VEHICLE

(71) Applicant: HONDA MOTOR CO., LTD., Tokyo (JP)

(72) Inventors: Takeshi Futamata, Wako (JP); Ippei Shibano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 34 days.

(21) Appl. No.: 16/108,677

(22) Filed: Aug. 22, 2018

(65) Prior Publication Data

US 2019/0077339 A1    Mar. 14, 2019

(30) Foreign Application Priority Data

Sep. 11, 2017  (JP) ............................. JP2017-174294

(51) Int. Cl.
| | | |
|---|---|---|
| B62K 11/00 | (2006.01) | |
| B60R 13/10 | (2006.01) | |
| B62K 25/28 | (2006.01) | |
| B62J 15/02 | (2006.01) | |
| B62L 1/00 | (2006.01) | |
| G09F 7/18 | (2006.01) | |
| B62K 5/027 | (2013.01) | |
| B62K 5/08 | (2006.01) | |
| B62K 19/16 | (2006.01) | |
| B62J 45/40 | (2020.01) | |

(52) U.S. Cl.
CPC ............ *B60R 13/105* (2013.01); *B62J 15/02* (2013.01); *B62K 25/283* (2013.01); *B62L 1/00* (2013.01); *B62J 45/40* (2020.02); *B62K 5/027* (2013.01); *B62K 5/08* (2013.01); *B62K 11/00* (2013.01); *B62K 19/16* (2013.01); *G09F 7/18* (2013.01); *G09F 2007/1865* (2013.01)

(58) Field of Classification Search
CPC ...... B62K 25/283; B62K 5/027; B62K 25/02; B60G 7/001
USPC ........................................................ 180/219
See application file for complete search history.

(56) References Cited

U.S. PATENT DOCUMENTS

| | | | |
|---|---|---|---|
| 7,232,014 B2 | 6/2007 | Nakaie | |
| 2005/0098596 A1* | 5/2005 | Yano | ...................... B62K 19/46 224/413 |

(Continued)

FOREIGN PATENT DOCUMENTS

| | | |
|---|---|---|
| CN | 105109588 | 12/2015 |
| JP | H09-263280 | 10/1997 |

(Continued)

OTHER PUBLICATIONS

Japanese Office Action dated Jul. 30, 2019, English translation included, 22 pages.

(Continued)

*Primary Examiner* — Toan C To

(74) *Attorney, Agent, or Firm* — Rankin, Hill & Clark LLP

(57) ABSTRACT

To permit easy reduction of a large-type rear fender or the like and to realize easy enhancement of appearance quality and mounting/detaching operability in the periphery of a license plate. A caliper bracket that is rotatably supported together with a rear wheel and that supports a rear wheel brake caliper is provided. The caliper bracket supports a license plate stay to which a license plate is attached.

9 Claims, 6 Drawing Sheets

(56) References Cited

U.S. PATENT DOCUMENTS

| | | | | |
|---|---|---|---|---|
| 2006/0278456 | A1* | 12/2006 | Desrosiers | B62J 15/00 180/219 |
| 2008/0023242 | A1* | 1/2008 | Lachapelle | B62J 15/00 180/210 |
| 2009/0065278 | A1* | 3/2009 | White | B62K 25/283 180/227 |
| 2010/0071985 | A1* | 3/2010 | Harada | B60T 8/3685 180/219 |
| 2010/0230199 | A1* | 9/2010 | Roth | B62K 25/283 180/219 |
| 2011/0063862 | A1* | 3/2011 | Hotei | B60Q 1/2607 362/473 |
| 2014/0226350 | A1* | 8/2014 | Mikura | B62J 6/02 362/475 |
| 2016/0297497 | A1* | 10/2016 | Nolin | B62K 25/283 |
| 2016/0368340 | A1* | 12/2016 | Nolin | B62K 25/283 |
| 2020/0031293 | A1* | 1/2020 | Conine | B60Q 1/38 |

FOREIGN PATENT DOCUMENTS

| | | |
|---|---|---|
| JP | H10-218066 | 8/1998 |
| JP | 2002-211469 | 7/2002 |
| JP | 2004-074915 | 3/2004 |
| JP | 2006-069300 | 3/2006 |
| JP | 2011-068339 | 4/2011 |
| JP | 2014-189225 | 10/2014 |
| JP | 2015-081006 | 4/2015 |
| JP | 2016-175592 | 10/2016 |

OTHER PUBLICATIONS

Japanese Office Action dated Mar. 12, 2019, English abstract included, 10 pages.
European Office Action dated Aug. 27, 2019, 4 pages.
Indian Office Action dated Jun. 18, 2020, English translation included, 5 pages.

* cited by examiner

SADDLE RIDING VEHICLE

INCORPORATION BY REFERENCE

The present application claims priority under 35 U.S.C. § 119 to Japanese Patent Application No. 2017-174294 filed on Sep. 11, 2017. The content of the application is incorporated herein by reference in its entirety.

TECHNICAL FIELD

The present invention relates to a saddle riding vehicle to which a license plate is attached.

BACKGROUND ART

In relation to a saddle riding vehicle such as a two-wheeled motor vehicle, there has been known a structure in which a rear wheel is provided with a brake disc, and a brake caliper that restricts rotation of the brake disc is supported by a body frame or a sub-frame connected to a vehicle body (see, for example, Patent Document 1).

PRIOR ART DOCUMENT

Patent Document

[Patent Document 1]
Japanese Patent Laid-Open No. 1998-218066

SUMMARY OF THE INVENTION

Problem to be Solved by the Invention

There is no disclosure of a license plate (also called number plate) in Patent Document 1. When running on a road (highway), however, a license plate is needed. In general, a license plate is attached to a large-type rear fender or cowl disposed under a seat, or attached to a stay extending from the vehicle body.

However, the large-type rear fender or the like is needed, and there is a possibility that appearance quality and mounting/detaching operability in the periphery of the license plate may be worsened.

The present invention has been made in consideration of the above-mentioned circumstances. Accordingly, it is an object of the present invention to permit reduction of a large-type rear fender or the like and to realize easy enhancement of appearance quality and mounting/detaching operability in the periphery of a license plate.

Means for Solving the Problem

In order to achieve the above object, an aspect of the present invention provides a saddle riding vehicle including: a swing arm (28) that supports a rear wheel (13); and a caliper bracket (73) that is rotatably supported together with the rear wheel (13) and that supports a rear wheel brake caliper (72), in which wherein the caliper bracket (73) supports a license plate stay (81) to which a license plate (80) is to be attached.

In the aspect of the invention as above, the saddle riding vehicle may include a rear fender (87) which is supported by the license plate stay (81) and to which the license plate (80) is to be attached.

In addition, in the above-mentioned aspect of the invention, the caliper bracket (73) may be located above an axle (13J) of the rear wheel (13).

In addition, in the above-mentioned aspect of the invention, the rear wheel brake caliper (72) may be located on an upper side of the swing arm (28) in side view of a vehicle body.

In addition, in the above-mentioned aspect of the invention, a rear edge (76S) of the caliper bracket (73) and a rear edge (83S) of the license plate stay (81) may be continuous with each other in side view of a vehicle body.

In addition, in the above-mentioned aspect of the invention, a front edge (76F) of the caliper bracket (73) and a front edge (82F) of the license plate stay (81) may be continuous with each other in side view of a vehicle body.

In addition, in the above-mentioned aspect of the invention, a through-hole (77) may be provided between a rear edge (76S) and a front edge (76F) of the caliper bracket (73), and a wheel speed sensor (92) that detects speed of the rear wheel (13) may be fixed to the caliper bracket (73) in such a manner as to overlap with the through-hole (77).

In addition, in the above-mentioned aspect of the invention, the license plate stay (81) may be Y-shaped in side view of a vehicle body.

In addition, in the above-mentioned aspect of the invention, the saddle riding vehicle may include: a pivot frame (25) that rotatably supports a front end of the swing arm (28); and a resin frame (61) extending in a longitudinal vehicle direction while passing on an upper side of the pivot frame (25), in which the pivot frame (25) and the resin frame (61) are fastened together by a fastening member (63) penetrating the pivot frame (25) and the resin frame (61) in a vertical direction.

Advantageous Effects of the Invention

In the aspect of the present invention, the caliper bracket that is rotatably supported together with the rear wheel and that supports the rear wheel brake caliper is provided, and the caliper bracket supports the license plate stay to which the license plate is to be attached. Therefore, it is unnecessary to attach the license plate to a large-type rear fender or cowl disposed under the seat, or to attach the license plate to a stay extending from the vehicle body. As a result, easy reduction of a large-type rear fender or the like is permitted, and easy enhancement of appearance quality and mounting/detaching operability in the periphery of the license plate is realized.

In the above-mentioned aspect of the invention, the rear fender which is supported by the license plate stay and to which the license plate is attached is provided. Therefore, the license plate stay can be utilized also as a stay for the rear fender, so that the number of component parts can be reduced.

In addition, in the above-mentioned aspect of the invention, the caliper bracket is located above the axle of the rear wheel. Therefore, the distance from the caliper bracket to the support position of the license plate can be shortened, and the length of the license plate stay can be suppressed.

Besides, in the above-mentioned aspect of the invention, the rear wheel brake caliper is located on the upper side of the swing arm in side view of the vehicle body. Therefore, a vacant space on the upper side of the swing arm can be used as a space for the caliper, and the caliper can be efficiently disposed in the saddle riding vehicle which is limited in space for disposing members.

In addition, in the above-mentioned aspect of the invention, the rear edge of the caliper bracket and the rear edge of the license plate stay are continuous with each other in side view of the vehicle body. Therefore, the caliper bracket and the license plate stay can be easily integrated in external appearance, so that appearance quality is enhanced.

Besides, in the above-mentioned aspect of the invention, the front edge of the caliper bracket and the front edge of the license plate stay are continuous with each other in side view of the vehicle body. Therefore, the caliper bracket and the license plate stay can be easily integrated in external appearance, so that appearance quality is enhanced.

In addition, in the above-mentioned aspect of the invention, the through-hole is provided between the rear edge and the front edge of the caliper bracket, and the wheel speed sensor that detects the speed of the rear wheel is fixed to the caliper bracket in such a manner as to overlap with the through-hole. Therefore, the wheel speed sensor can be held through utilization of the caliper bracket, and the wheel speed sensor can detect the rotation of the pulser ring through effective utilization of the through-hole provided in the caliper bracket.

Besides, in the above-mentioned aspect of the invention, the license plate stay is Y-shaped in side view of the vehicle body. Therefore, the caliper bracket is lightened on the inner side, and easy reductions in weight and cost can be achieved.

In addition, in the above-mentioned aspect of the invention, the saddle riding vehicle includes the pivot frame that rotatably supports the front end of the swing arm, and the resin frame that extends in the longitudinal vehicle direction while passing on the upper side of the pivot frame, and the pivot frame and the resin frame are fastened together by the fastening member penetrating the pivot frame and the resin frame in the vertical direction. As a result of this, an operation of fastening the pivot frame and the resin frame is facilitated, the fastening member is restrained from being exposed to a lateral side of the vehicle body, and easy enhancement of appearance quality can be realized.

MODE FOR CARRYING OUT THE INVENTION

Figure 1:
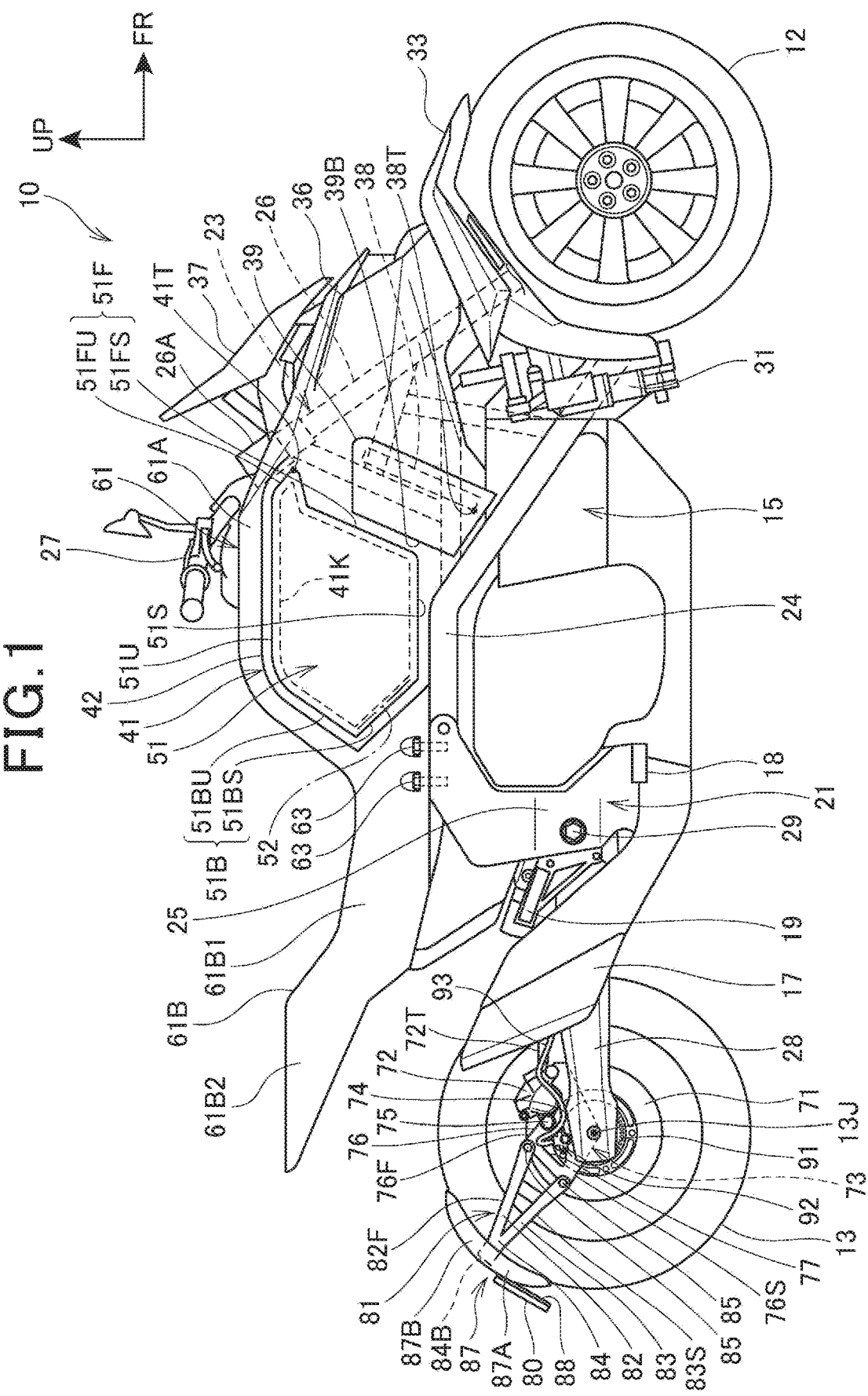
FIG. 1 is a right side view of a saddle riding vehicle according to an embodiment of the present invention.

An embodiment of the present invention will be described below, referring to the drawings. Note in the description, the descriptions of the directions such as forward, rearward, leftward, rightward, upward and downward directions are the same as those with respect to the vehicle body, unless specified otherwise. In addition, reference symbol FR in the drawings indicates the front side of the vehicle body, reference symbol UP indicates the upper side of the vehicle body, and reference symbol LH indicates the left-hand side of the vehicle body.

Figure 2:
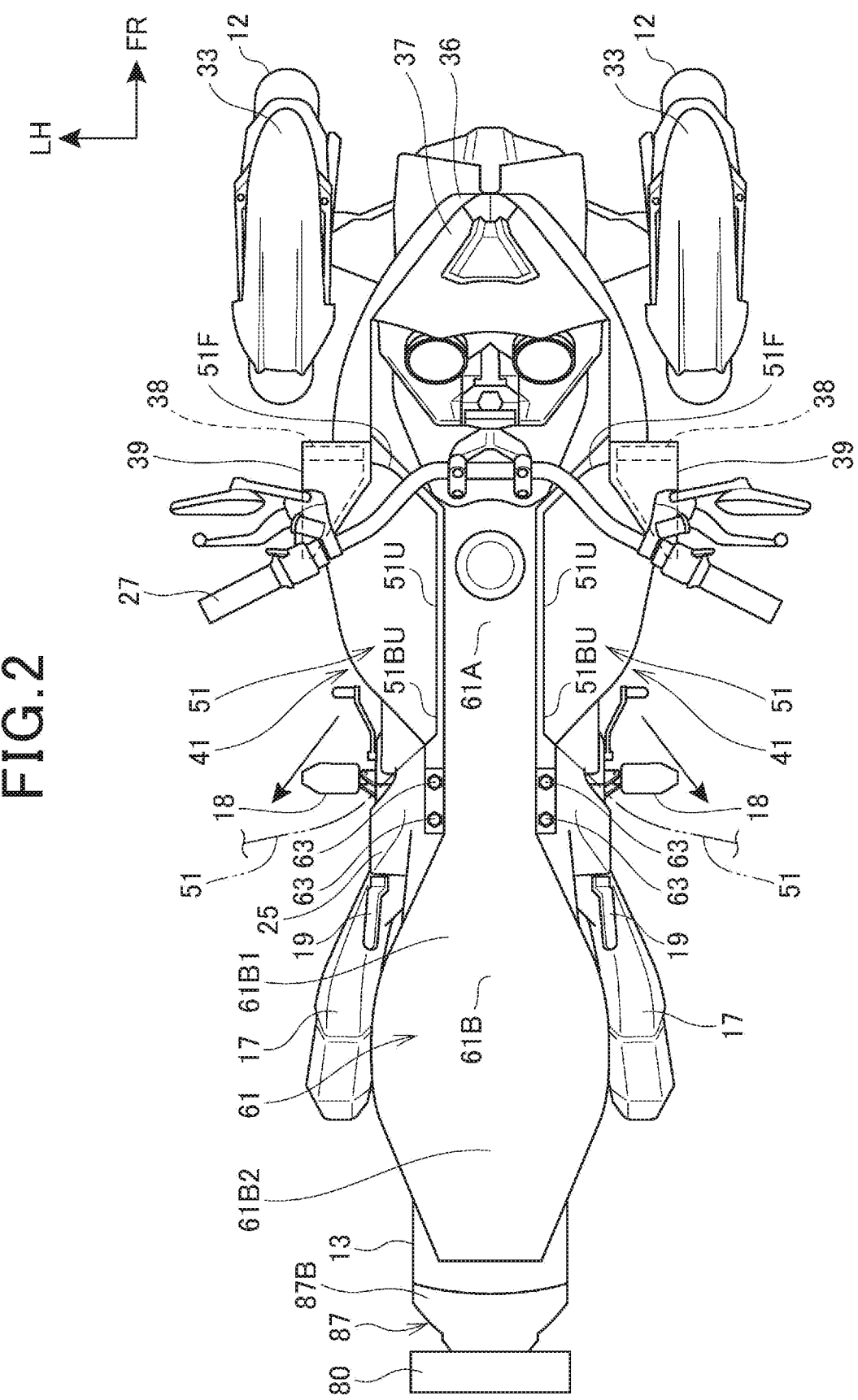
FIG. 2 is a top plan view of the saddle riding vehicle.
Figure 3:
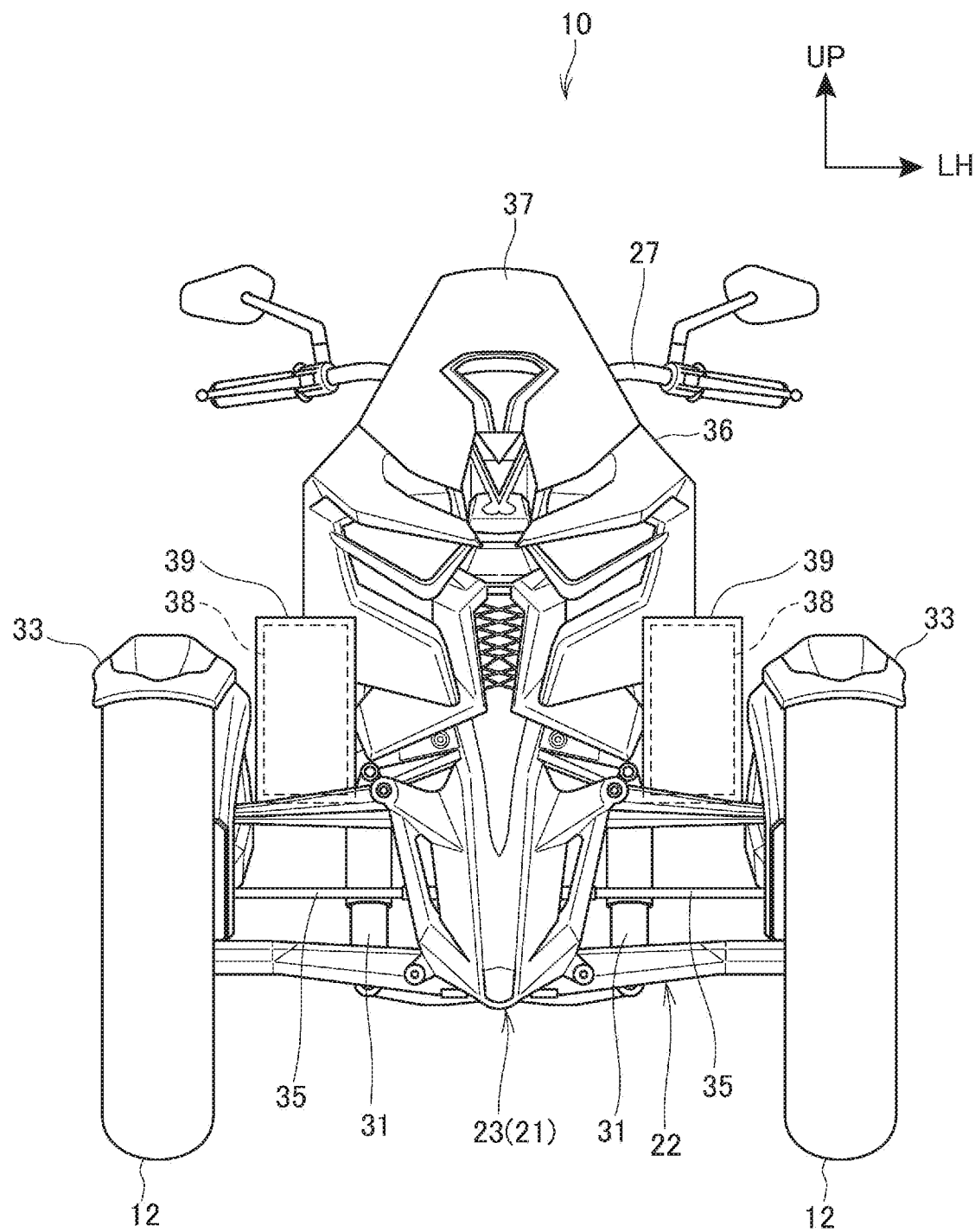
FIG. 3 is a front view of the saddle riding vehicle.

FIG. 1 is a right side view of a saddle riding vehicle according to an embodiment of the present invention, FIG. 2 is a top plan view, and FIG. 3 is a front view. As depicted in FIGS. 1 to 3, the saddle riding vehicle 10 is a three-wheeled vehicle having a pair of left and right front wheels 12 and one rear wheel 13, and is an oscillation type vehicle in which the vehicle body is capable of oscillation to the left and right sides with respect to the pair of left and right front wheels 12. In addition, a power unit 15 of the saddle riding vehicle 10 is an engine (also called internal combustion engine) disposed in the center in regard of the longitudinal vehicle direction.

Note that the power unit 15 may be a motor, or may be both an engine and a motor. Reference symbol 17 in FIG. 1 and the like denote an exhaust muffler, reference symbol 18 denotes a driver's footrest, and reference symbol 19 denotes a passenger's footrest.

A body frame 21 of the saddle riding vehicle 10 has a front frame section 23 (FIG. 3) by which the pair of left and right front wheels 12 are supported in a vertically oscillatable manner through a pair of upper and lower arm sections 22 (FIG. 3). Further, the body frame 21 includes a power unit support frame 24 (FIG. 1) that supports the power unit 15, and a pivot frame 25 (FIG. 1) connected to a rear portion of the power unit support frame 24.

As depicted in FIG. 1, the front frame section 23 has a steering shaft support section 26A (also called head pipe) that rotatably supports a steering shaft 26 extending vertically in the center in regard of the transverse direction of the vehicle (vehicle width direction). The steering shaft support section 26A is supported by the power unit support frame 24 through, for example, a frame member 26B extending downward from the steering shaft support section 26A.

The steering shaft support section 26A and the steering shaft 26 are inclined rearwardly upward in side view of the vehicle body. A bar-type steering handle 27 is attached to an upper end portion of the steering shaft 26, and a steering mechanism (not depicted) for steering the front wheels 12 is connected to a lower end portion of the steering shaft 26.

Reference symbol 31 in FIG. 3 and the like denote a pair of left and right front cushions, and reference symbol 33 denotes a pair of left and right front fenders that individually covers the upper side of the front wheels 12. In addition, reference symbol 35 denotes a tie rod that constitutes part of the steering mechanism for steering the front wheels 12, reference symbol 36 denotes a front cowl that covers the front side of the vehicle body, and reference symbol 37 denotes a windscreen attached to the front cowl 36.

As depicted in FIGS. 1 to 3, a pair of left and right radiators 38 are disposed on the lower side of the steering shaft support section 26A, and the left and right radiators 38 are surrounded by radiator shrouds 39 (also called radiator covers). The radiator shrouds 39 rectify airflow toward the radiators 38, and function as guard members for guarding the radiators 38. The left and right radiators 38 are formed in a rectangular shape in front view of the vehicle body, are inclined rearwardly downward in side view of the vehicle body, and cool cooling water circulated in the power unit 15 by the airflow.

As depicted in FIG. 1, each of the radiators 38 is disposed between an accommodation box 41, which is disposed at a front upper portion of the vehicle body and will be described later, and the front wheel 12 in side view of the vehicle body. Besides, as depicted in FIG. 2, the radiators 38 are disposed on the front left and right sides of the accommodation box 41 in plan view of the vehicle body. Further, as depicted in FIG. 3, each of the radiators 38 is located between the front wheel 12 and the front cowl 36 in front view of the vehicle body.

As a result of these, the radiators 38 are disposed while utilizing efficiently the spaces formed between the accommodation box 41, the front wheels 12 and the front cowl 36.

As depicted in FIG. 1 and the like, the accommodation box 41 formed with openings 41K on the left and right sides of the vehicle body are disposed on the upper side of the power unit support frame 24 and on the rear side of the steering shaft 26.

The accommodation box 41 is provided with a pair of left and right covers 51 with which the left and right openings 41K of the accommodation box 41 can be closed and opened. The configurations of the accommodation box 41 and the covers 51 will be described later.

As depicted in FIGS. 1 and 2, the saddle riding vehicle 10 is provide with a resin frame 61 directed in the longitudinal vehicle direction while passing the upper side of the center of the accommodation box 41. The resin frame 61 is integrally provided with a front-side resin frame section 61A which is formed of a resin material and extends in the longitudinal vehicle direction on the upper side of the center of the accommodation box 41, and a rear-side resin frame section 61B extending in the longitudinal vehicle direction in continuation with a rear edge of the front-side resin frame section 61A. The resin frame 61 is formed, for example, by molding of resin.

The front-side resin frame section 61A is formed in a belt shape narrower in width (corresponding to length in the transverse direction) than the accommodation box 41, and covers the center in regard of the transverse direction of the accommodation box 41 over its range in the longitudinal vehicle direction. As a result, the front-side resin frame section 61A functions as a guard member for guarding the accommodation box 41.

In addition, the front-side resin frame section 41 is formed in a shape resembling a fuel tank or a tank cover of an existing saddle riding vehicle, in conformity with the accommodation box 41, and functions also as an external appearance component of the saddle riding vehicle 10.

The rear-side resin frame section 61B extends rearward on the rear side of the accommodation box 41 and on the upper side of the power unit support frame 24, and is formed in a shape wider in width than the front-side resin frame section 61A. The rear-side resin frame section 61B is fastened (corresponding to "fixed") to the power unit support frame 24 by fastening members 63 (for example, fastening bolts) penetrating from the upper side toward the lower side on the rear lower side of the accommodation box 41.

As depicted in FIG. 1, the rear-side resin frame section 61B is integrally provided with a seat section 61B1 which is recessed downward on the rear side of the accommodation box 41 and on which the driver (also called rider) and the like are to be seated, and a rear section 61B2 which extends rearward from the seat section 61B1 and resembling in external appearance a vehicle body rear section (also called tail section) of an existing saddle riding vehicle. Since the rear section 61B2 covers the front upper side of the rear wheel 13, it can function as a front-side rear fender that shields rainwater or the like coming from the rear wheel 13 toward the seat section 61B1.

The pivot frame 25 rotatably supports a front end of a swing arm 28 through a pivot shaft 29. The swing arm 28 extends rearward, and rotatably supports the rear wheel 13 at a rear end thereof. By this, the swing arm 28 is supported in a vertically swingable manner, and supports the rear wheel 13 in a vertically movable manner. Note that a rear cushion is interposed between the swing arm 28 and the body frame 21.

(Accommodation Box 41 and Covers 51)

The accommodation box 41 and the covers 51 will be described below.

Figure 4:
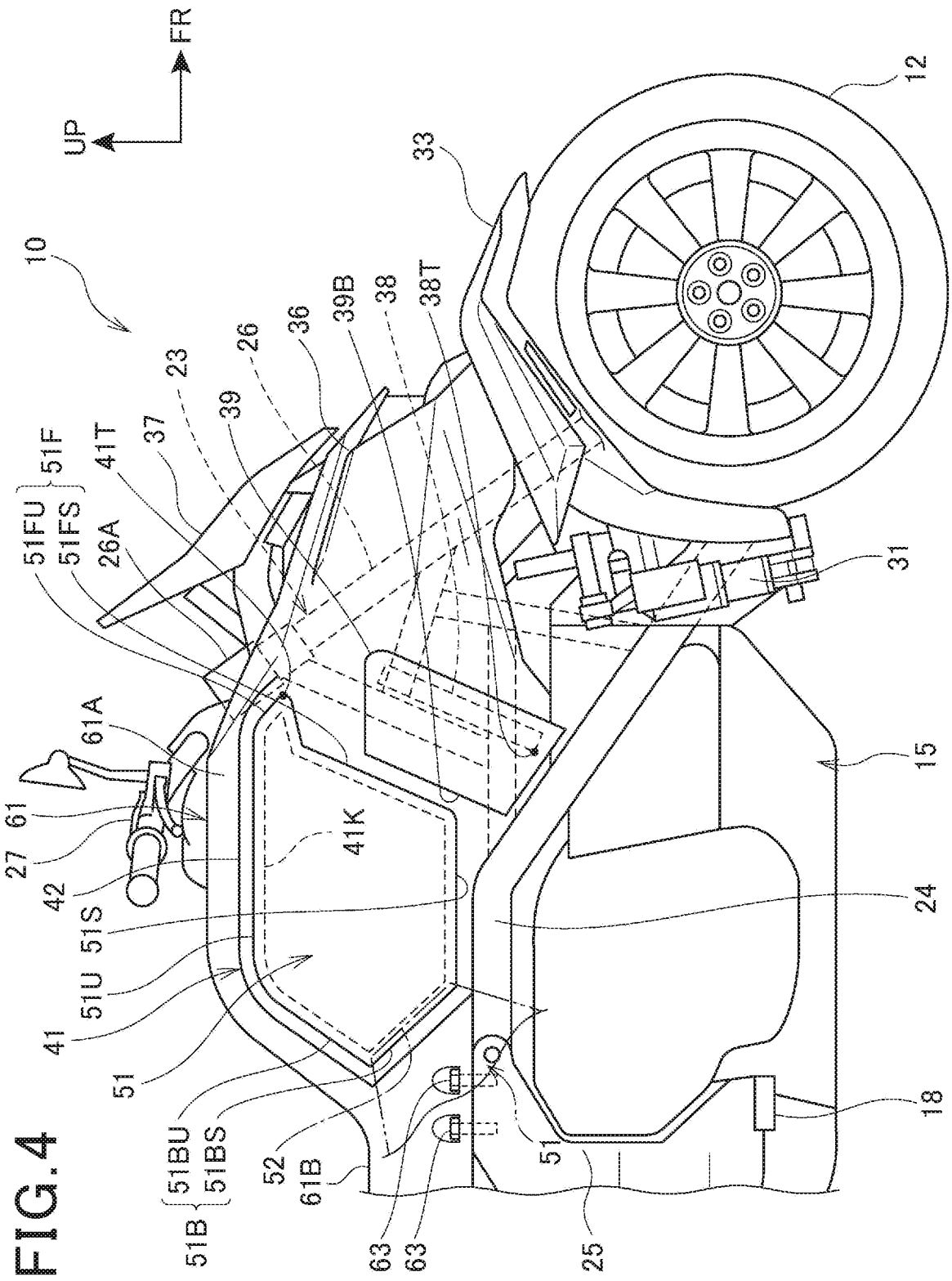
FIG. 4 is a figure depicting an accommodation box together with the peripheral configuration, as viewed from the right side of the vehicle body.

FIG. 4 is a figure depicting the accommodation box 41 together with the peripheral configuration, as viewed from the right side of the vehicle body.

The accommodation box 41 includes a box main body 42 formed with the openings 41K on both the left and right sides, and the pair of left and right covers 51 with which the left and right openings 41K of the box main body 42 can be closed and opened. The box main body 42 is formed in a hollow box shape resembling a fuel tank of an existing saddle riding vehicle, and is formed from a resin material, a metallic material or the like.

The left and right openings 41K are formed with a spacing therebetween in the transverse direction, whereby they are located on the left and right outer sides of the front-side resin frame section 61A, as depicted in FIG. 2. While the left and right openings 41 are of the same shape in side view of the vehicle body in the present embodiment, they may not be limited to the same shape on the left and right sides.

Note that the opening 41K may be provided on either one of the left and right sides, and the opening 41K may be opened and closed with the cover 51. In short, the opening 41K needs only be provided on at least one of the left and right sides in such a manner that the opening 41K can be opened and closed with the cover 51.

The pair of left and right covers 51 are formed in shapes of left-right symmetry with reference to the center in regard of the transverse direction. As depicted in FIG. 4, an outer edge 51BS of a rear lower portion of the cover 51 (the outer edge corresponding to a rear edge lower portion (first inclination section), hereinafter referred to as rear edge lower portion 51BS) is inclined rearwardly upward in side view of the vehicle body. A support shaft 52 (also called rotary shaft) along the rear edge lower portion 51BS is provided between that portion of the cover 51 which is near the rear edge lower portion 51BS and the box main body 42, and the cover 51 is supported to be openable and closable with reference to the support shaft 52. In FIGS. 4 and 2, the cover 51 in a state of being opened with reference to the support shaft 52 is indicated by alternate long and two short dashes line.

Since the cover 51 is opened and closed with reference to the rear lower portion (rear edge lower portion 51BS) of the cover 51, the cover 51 is opened in an opening-forward manner where the cover 51 is opened relatively wider on the front side than on the rear side. By the opening-forward, the cover 51 can be opened to the side of spacing away from the radiator 38 and the radiator shroud 39 (to the rear side).

Therefore, the cover 51 can be easily opened and closed without contact with, for example, members located on the front side of the cover 51 (in the present configuration, the radiator 38 and the radiator shroud 39), as compared to the case where the cover 51 is opened in an opening-rearward manner (a configuration in which the cover 51 is opened and closed in the longitudinal vehicle direction with reference to a front edge 51F thereof). In addition, the cover 51 can be easily opened and closed without contact with, for example, a member located on the lower side of the cover 51 (in the present configuration, the power unit 15 and the peripheral parts), as compared to the case where the cover 51 is opened in an opening-upward manner (a configuration in which the cover 51 is opened and closed vertically with reference to a lower edge 51S thereof).

For this reason, members disposed on the front side and the lower side and the like of the cover 51 would not obstruct the opening and closing of the cover 51, so that the cover 51 can be easily opened and closed, and easy access to the inside of the box main body 42 is ensured. Since the members disposed on the front side and the lower side and the like of the cover 51 would not obstruct the opening and closing of the cover 51, it becomes easy to enlarge the cover 51 in size and to enlarge the opening 41K in size, whereby easier access to the inside of the box main body 42 is ensured.

In addition, in the present configuration, the support shaft 52 as a rotary shaft for the cover 51 is inclined rearwardly downward, and, accordingly, the cover 51 is opened toward a rear lower side. If the cover 51 is opened just toward the rear side, the cover 51 would be liable to make contact with the upper half of the body of the driver seated on the seat section 61B1.

Therefore, in the present configuration, the cover 51 is easily opened such as to avoid the upper half of the body of the driver on the rear side. Moreover, where the cover 51 is opened, the cover 51 can be maintained in the opened state by the action of gravitation. Therefore, as compared to the case where the cover 51 is opened in the opening-rearward manner or in an opening-downward manner (a configuration in which the cover 51 is opened vertically with reference to an upper edge thereof), the need for a holding mechanism for holding the cover 51 in the opened state is eliminated, and it becomes easy, for example, to reduce the number of component parts.

An outer shape of the covers 51 will be described. As depicted in FIG. 4, the cover 51 includes: the front edge 51F inclined rearwardly downward along a rear edge 39B of the radiator shroud 39; the lower edge 51S extending horizontally rearward from a lower end of the front edge 51F; a rear edge 51B which is in a V shape in side view, being inclined rearwardly upward from a rear end of the lower edge 51S and then inclined forwardly upward; and an upper edge 51U extending horizontally forward from an upper end of the rear edge 51B and connected to an upper end of the front edge 51F.

Of the front edge 51F, a region 51FS at a front lower portion proximate to the radiator shroud 39 (the region corresponding to a front edge lower portion (second inclination section), hereinafter referred to as front edge lower portion 51FS) is inclined rearwardly downward in parallel to the rear edge 39B of the radiator shroud 39.

This ensures that the front edge lower portion 51FS can be disposed close to the radiator shroud 39, and a space at the rear of the radiator shroud 39 can be effectively utilized for the cover 51. Note that since the rear edge 39B of the radiator shroud 39 extends along the inclination of the radiator 38, the front edge lower portion 51FS can be said to be inclined along the radiator 38.

Of the front edge 51F, a region 51FU at a front upper portion (the region corresponding to a front edge upper portion, hereinafter referred to as front edge upper portion 51FU) is formed in a projecting shape projecting forward on the upper side of the radiator shroud 39. This ensures that even when the opening 41K of the box main body 42 is broadened forward on the upper side of the radiator shroud 39, the broadened portion can be covered with the cover 51.

In other words, the opening 41K and the cover 51 can be enlarged in size by utilizing the space on the upper side of the radiator shroud 39.

The lower edge 51S and the upper edge 51U of the cover 51 extend horizontally over the range in the longitudinal vehicle direction in side view of the vehicle body. In addition, in the present configuration, the openings 41K of the accommodation box 41 are each formed along the lower edge 51S and the upper edge 51U of the cover 51, whereby the openings 41K are efficiently enlarged in size.

The rear edge 51B of the cover 51 is composed of: the rear edge lower portion 51BS (corresponding to the first inclination section) inclined rearwardly upward from the rear end of the lower edge 51S; and the rear edge upper portion 51BU (corresponding to the third inclination section) which is an outer edge inclined forwardly upward from the rear end of the rear edge lower portion 51BS and connected to the rear end of the upper edge 51U.

Since the rear edge upper portion 51BU of the cover 51 is inclined rearwardly downward, it is inclined along a rear upper portion of the accommodation box 41 that is in a shape resembling a fuel tank or a tank cover. Therefore, the cover 51 can be efficiently enlarged in size toward the rear side, the opening 41K can also be enlarged in size toward the rear side, and things to be accommodated can be brought in and out easily.

Thus, in the saddle riding vehicle 10 according to the present embodiment, the radiators 38 are disposed between the accommodation box 41 and the front wheels 12, the rear edge lower portions 51BS as at least parts of the rear edges 51B of the covers 51 with which the openings 41K of the accommodation box 41 can be closed and opened are inclined obliquely in side view of the vehicle body, and the covers 51 are supported in an opening-forward manner with reference to the support shafts 52 extending along the inclination. According to this configuration, when the cover 51 is opened and closed, the contact thereof with such members as the radiator 38 disposed on the front side of the accommodation box 41 can be easily avoided, so that the cover 51 can be easily opened and closed.

Moreover, the rear edge lower portions 51BS (corresponding to the first inclination sections) of the covers 51 are inclined rearwardly upward in side view of the vehicle body, the support shafts 52 are provided at rear lower portions of the covers 51, and they extend along the rear edge lower portions 51BS of the covers 51 in side view of the vehicle body. According to this configuration, when the cover 51 is opened and closed, it is easy to avoid the upper half of the body of the rider present on the rear side of the cover 51, and the cover 51 can be easily maintained in the opened state by utilizing gravitation.

In addition, the front edges 51F of the covers 51 each have the front edge lower portion 51FS (corresponding to the second inclination section), and a lower portion of the cover 51 is so shaped that its length in the longitudinal vehicle direction becomes shorter in going downward, due to the rear edge lower portion 51BS (the first inclination section) and the front edge lower portion 51FS (the second inclination section). This ensures that due to the rear edge lower portions 51BS, a space can be easily secured on the rear lower side of the accommodation box 41, and spaces for the fastening members 63 and the pivot frame 25 and the like can be secured sufficiently. In addition, due to the front edge lower portions 51FS, spaces can be easily secured between the accommodation box 41 and the front wheels 12, and spaces for the radiators 38 and the like can be easily secured.

Besides, since the radiators 38 are each disposed along the front edge lower portion 51FS (the second inclination section) of the cover 51 in side view of the vehicle body, the radiators 38 can be disposed close to the accommodation box 41, and the radiators 38 can be efficiently disposed in the saddle riding vehicle 10 which is limited in space for disposing members.

Moreover, rear ends 38T (FIG. 4) of the radiators 38 are located on the rear side of the vehicle body, in relation to a front edge 41T (FIG. 4) of the accommodation box 41. As a result of this, the accommodation box 41 and the radiators 38 overlap with each other at least partly in plan view of the vehicle body, so that the accommodation box 41 and the radiators 38 can be efficiently disposed in the saddle riding vehicle 10 which is limited in space for disposing members.

In addition, as depicted in FIGS. 2 and 3, the radiators 38 project to the outer sides in regard of the transverse direction relative to the accommodation box 41 in front view of the vehicle body, so that the large-sized radiators 38 can be easily disposed, and a sufficient cooling efficiency can be easily secured.

Besides, in the present configuration, the resin frame 61 (FIG. 2) extends in the longitudinal vehicle direction while passing the upper side of the center of the accommodation box 41, and, therefore, the resin frame 61 does not obstruct the opening and closing of the covers 51. This ensures that the covers 51 can be opened and closed in a state in which cargo such as a tank bag is loaded on the resin frame 61.

In addition, the rear edge 51B of the cover 51 has the rear edge upper portion 51BU (corresponding to the third inclination section) inclined rearwardly downward in side view of the vehicle body, and the cover 51 is so shaped that its vertical length becomes shorter in going rearward, due to the rear edge lower portion 51BS (the first inclination section) and the rear edge upper portion (the third inclination section). This permits the resin frame 61 to be disposed along the rear edge upper portion 51BU (the third inclination section) of the cover 51, whereby the resin frame 61 can be easily shaped to resemble a fuel tank or a tank cover of an existing saddle riding vehicle.

Besides, the resin frame 61 is disposed in the state of being bent along the rear edge lower portion 51BS (the first inclination section) and the rear edge upper portion 51BU (the third inclination section) in side view of the vehicle body (FIG. 4), so that the resin frame 61 can be efficiently disposed along the accommodation box 41.

In addition, the resin frame 61 and the pivot frame 25 under the resin frame 61 are fastened by the fastening members 63 which penetrate them in the vertical direction. According to this configuration, an operation of fastening the pivot frame and the resin frame is facilitated, the fastening members 63 can be restrained from being exposed to the lateral sides of the vehicle body, and appearance quality of the vehicle body can be easily enhanced thereby.
(Rear Portion Structure of Saddle Riding Vehicle 10)

Now, a rear portion structure of the saddle riding vehicle 10 will be described below.

Figure 5:
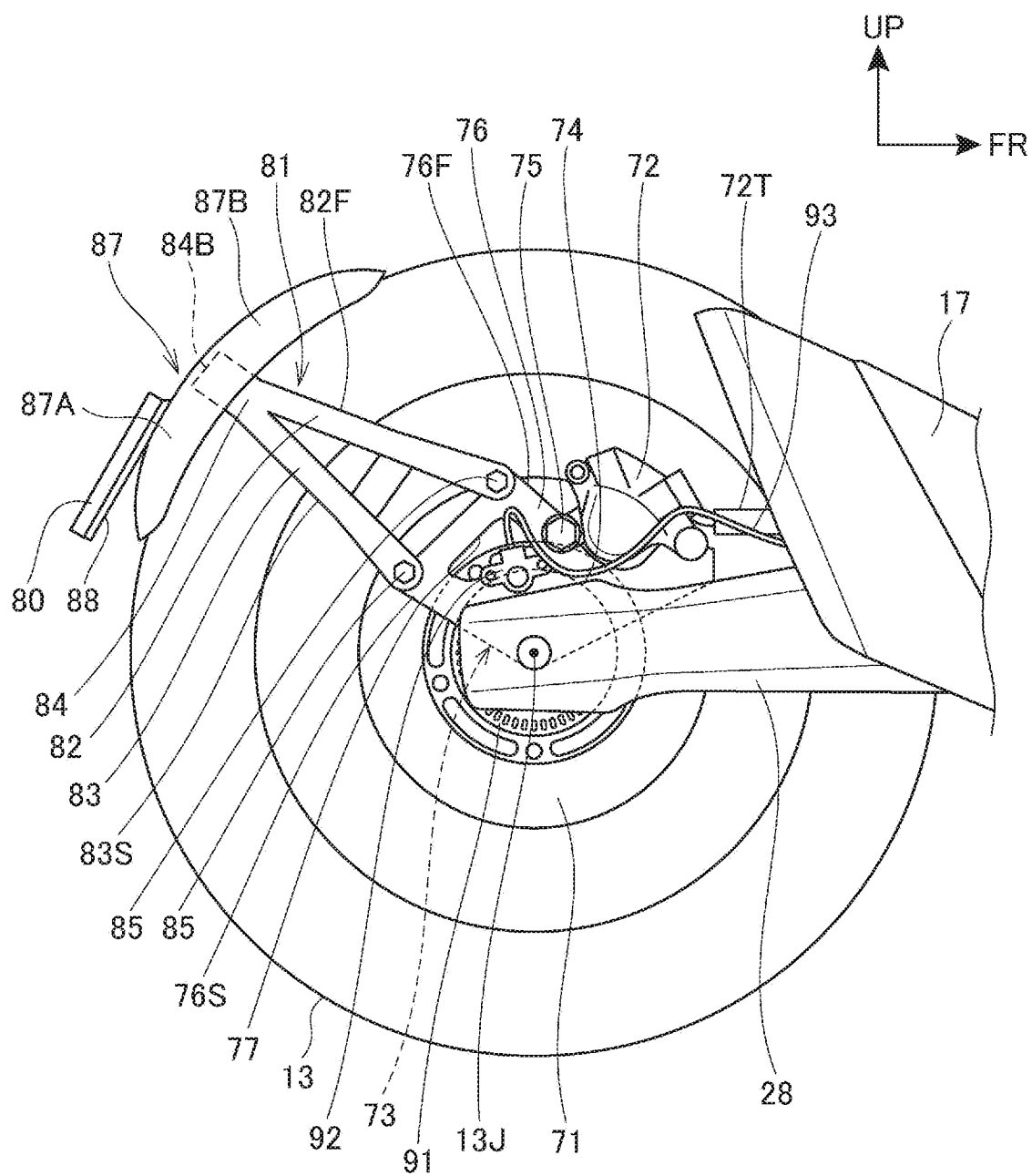
FIG. 5 is a figure depicting a rear wheel together with the peripheral configuration, as viewed from the right side of the vehicle body.
Figure 6:
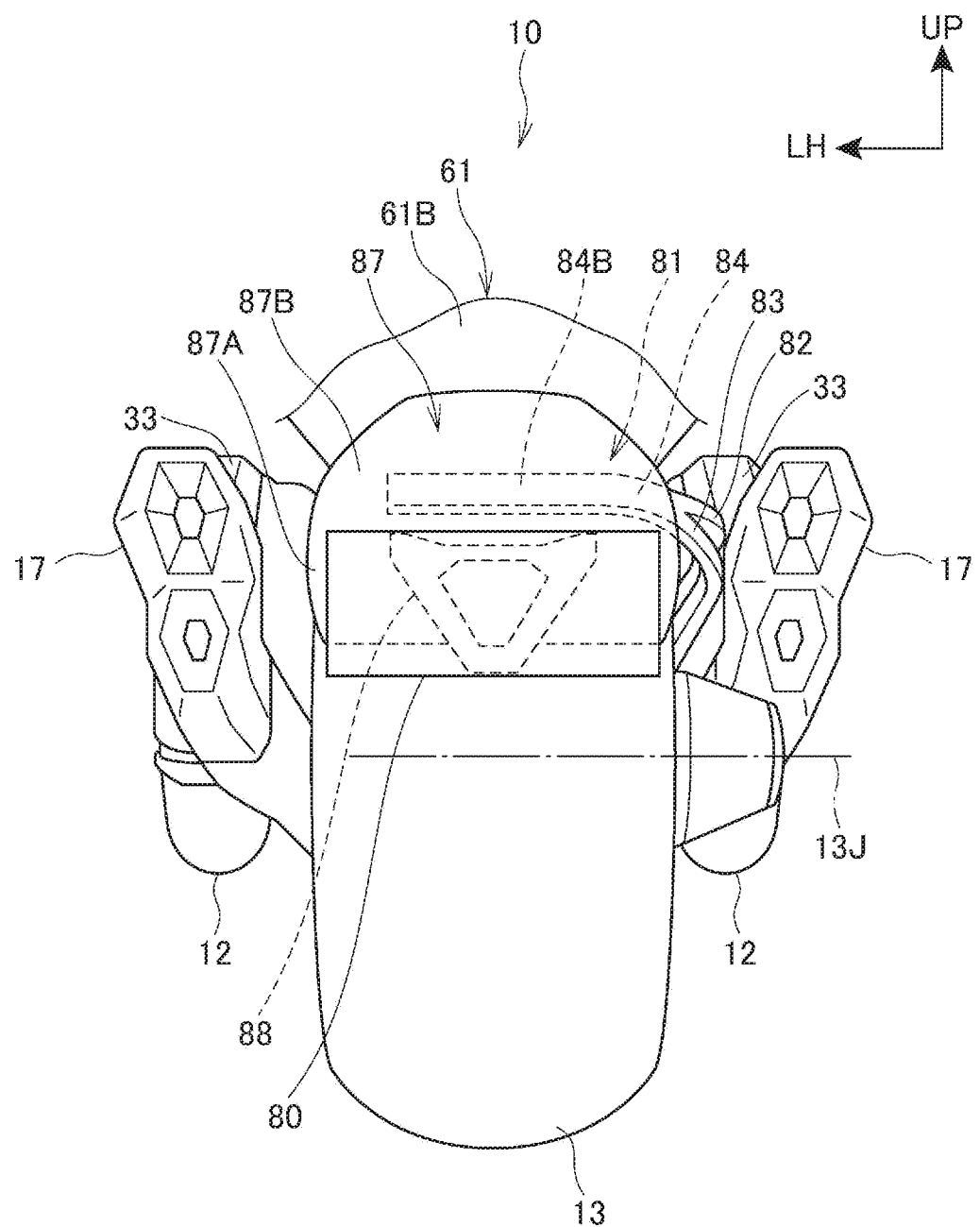
FIG. 6 is a back elevation of the saddle riding vehicle.

FIG. 5 is a figure depicting the rear wheel 13 and the peripheral configuration as viewed from the right side of the vehicle body, and FIG. 6 is a back elevation of the saddle riding vehicle 10.

As depicted in FIGS. 5 and 6, the swing arm 28 is of a cantilever type in which the rear wheel 13 is supported in a cantilever manner.

As depicted in FIG. 5, a brake disc 71, a rear wheel brake caliper 72 and a caliper bracket 73 constituting a rear wheel brake for braking the rear wheel 13 are disposed at a rear end portion of the swing arm 28. The brake disc 71 is disposed on one of the left and right side (in the present configuration, the right side) of the rear wheel 13, and is rotated together with the rear wheel 13. The caliper bracket 73 is rotatably supported together with the rear wheel 13, and supports the rear wheel brake caliper 72 that brakes the rotation of the brake disc 71. Known configurations can be widely applied to the brake disc 71 and the rear wheel brake caliper 72.

The caliper bracket 73 is formed to have a substantially sector-like outer shape extending radially outward from an axle 13J (also called rear axle) of the rear wheel 13, and is integrally formed from a metallic material. It is to be noted, however, that other material than a metallic material may be used for the caliper bracket 73.

The caliper bracket 73 in the present configuration is formed as a bracket extending to the upper side and a rear upper side of the axle 13J, and is located above the axle 13J. The rear wheel brake caliper 72 is fastened to the upwardly extending portion 74 by a fastening member 75 (for example, fastening bolt) or the like, and supports the rear wheel brake caliper 72 on a front upper side with reference to the axle 13J. The upwardly extending portion 74 will hereinafter be referred to as the "caliper support section 74" that supports the rear wheel brake caliper 72.

A license plate stay 81 is fixed to that part 76 of the caliper bracket 73 which extends to a rear upper side of the axle 13J. The license plate stay 81 is a member that supports a license plate 80 (also called number plate). That part 76 of the caliper bracket 73 which extends to the rear upper side will hereinafter be referred to as the "stay support section 76" that supports the license plate stay 81.

The stay support section 76 is formed in a trapezoidal shape which is narrowed in going away from the axle 13J toward the rear upper side in side view of the vehicle body (FIG. 5). A rear edge 76B of the stay support section 76 constitutes a part of a rear edge of the caliper bracket 73. In addition, a front edge 76F of the stay support section 76 constitutes a part of a front edge of the caliper bracket 73. The stay support section 76 is formed with a through-hole 77 penetrating it in the transverse direction, so as to reduce the weight of the stay support section 76.

In addition, a pulser ring 91 is attached to an inside circumference portion of the brake disc 71, and a part of the pulser ring 91 overlaps with the through-hole 77 in side view of the vehicle body. A wheel speed sensor 92 is disposed on the side (the outer side in regard of the transverse direction) opposite to the pulser ring 91, with the stay support section 76 therebetween.

The wheel speed sensor 92 is fixed to the stay support section 76 in such a manner as to overlap with the through-hole 77, and is disposed on the upper side of the swing arm 28 and the axle 13J and on the rear side of the rear wheel brake caliper 72. The wheel speed sensor 92 has a pick-up coil (not depicted) that generates a pulse signal due to a variation in magnetic flux attendant on rotation of the pulser ring 91, and the pick-up coil is provided at such a position as to overlap with the through-hole 77 in side view. As a result, the wheel speed sensor 92 can detect the rotation of the pulser ring 91 by utilizing the through-hole 77.

A wiring 93 extending from the wheel speed sensor 92 is curved in an upwardly projected shape from the wheel speed sensor 92, and extends on the upper side of the swing arm 28 along the swing arm 28 toward the front side of the vehicle body. As depicted in FIG. 5, in side view of the vehicle body, the wiring 93 extends along a downwardly projected curve from the upper side of the wheel speed sensor 92 toward the front side of the vehicle body, and then extends on the transversely outer side of the rear wheel brake caliper 72 along an upwardly projected curve toward the front side of the vehicle body.

A rear end portion 72T of a brake piping is connected to a front portion of the rear wheel brake caliper 72, and the rear end portion 72T and the wiring 93 overlap partly with each other in side view of the vehicle body.

The license plate stay 81 is formed in a Y shape in side view of the vehicle body, from a metallic material or other rigid material than a metallic material. More specifically, the license plate stay 81 integrally includes: two bar-shaped members 82 and 83 that are connected to the stay support section 76, extend rearward and join together at a rearmost end; and a rear-side bar-shaped member 84 extending rearward from the rearmost end which is the joint portion of the bar-shaped members 82 and 83.

The two bar-shaped members 82 and 83 form a V shape in side view, and are connected to the stay support section 76 from a lateral side of the vehicle body by fastening members 85 (for example, fastening bolts). Where connected, the upper-side bar-shaped member 82 extends rearward along a front edge 76F of the stay support section 76, whereas the lower-side bar-shaped member 83 extends rearward along a rear edge 76S of the stay support section 76.

As depicted in FIG. 6, the bar-shaped members 82 and 83 are curved to the inner side in regard of the transverse direction in going rearward, to be connected to the rear-side bar-shaped member 84 at the rearmost end.

As depicted in FIG. 5, in the present configuration, a front edge 82F of the upper-side bar-shaped member 82 (the front edge corresponding to a front edge of the license plate stay 81) is rectilinearly connected to a front edge 76F of the stay support section 76 (the front edge corresponding to a front edge of the caliper bracket 73), in side view of the vehicle body. In addition, a rear edge 83S of the lower-side bar-shaped member 83 (the rear edge corresponding to a rear edge of the license plate stay 81) is rectilinearly connected to a rear edge 76S of the stay support section 76 (the rear edge corresponding to a rear edge of the caliper bracket 73).

As a result of these, the license plate stay 81 and the caliper bracket 73 are integrated in external appearance, and become smaller in size in external appearance in going rearward. Note that the method for connecting the license plate stay 81 and the caliper bracket 73 is not limited to the method of using the fastening members 85, and other method may be applied.

The rear-side bar-shaped member 84 extends rectilinearly toward a rear upper side in side view of the vehicle body (FIG. 5), is curved toward the inner side in regard of the transverse direction in back view of the vehicle body (FIG. 6), and extends to a rear upper side of the rear wheel 13. As a result, that part 84B of the rear-side bar-shaped member 84 which is located at a rearmost end (referred to as the rearmost end section 84B) overlaps with the rear wheel 13 in back view of the vehicle body (FIG. 6), and is located above the axle 13J.

A rear fender 87 is attached to the rearmost end section 84B, and the license plate 80 is attached to a lower portion of the rear fender 87 through a license plate bracket 88 (hereinafter referred to as the plate bracket 88).

The rear fender 87 is a cover member that covers the rear wheel 13, and is formed from a metallic material or a resin material or the like. The rear fender 87 integrally includes: a rear extension section 87A extending rearwardly downward from the rearmost end section 84B of the license plate stay 81 along an outer peripheral surface of the rear wheel 13; and a front extension section 87B extending forwardly upward from the rearmost end section 84B along the outer peripheral surface of the rear wheel 13.

Since a rear upper side of the rear wheel 13 is covered with the rear fender 87, rainwater or the like coming from the rear upper side of the rear wheel 13 toward the rear-side resin frame section 61B (inclusive of the seat section 61B1 (see FIG. 1)) is intercepted. Therefore, the rainwater or the like coming from the rear wheel 13 can be intercepted, without disposing a large-type rear fender under the seat (under the seat section 61B1).

In addition, in the present configuration, rainwater or the like coming from the rear wheel 13 to the seat section 61B1 or the like can be intercepted by the rear fender 87 and the rear section 61B2 of the rear-side resin frame section 61B. Therefore, the rainwater or the like coming from the rear wheel 13 can be intercepted more effectively.

The plate bracket 88 is attached to the rear extension section 87A of the rear fender 87, and supports an upper portion of the license plate 80 at such a position as to overlap with a lower portion of the rear extension section 87A in back view of the vehicle body (FIG. 6). As a result, a lower portion of the license plate 80 is located below the rear extension section 87A of the rear fender 87, so that rainwater or the like coming from the rear wheel 13 is intercepted also by the license plate 80. Since the lower portion of the license plate 80 can be utilized also as a rear fender, the rear fender 87 can be reduced in size, and reductions in the size and weight of component parts surrounding the license plate 80 can be realized.

Thus, in the present embodiment, the caliper bracket 73 supporting the rear wheel brake caliper 72 supports the license plate stay 81 to which the license plate 80 is attached. For this reason, it is unnecessary to attach the license plate 80 to a large-type rear fender or cowl disposed under the seat (corresponding to the seat section 61B1), or to attach the license plate 80 to a stay extending from the vehicle body.

Therefore, it is easy to enhance appearance quality in the periphery of the license plate 80, as compared to the case where the license plate 80 is attached to a large-type rear fender or cowl. In addition, the caliper bracket 73 and the license plate stay 81 can be mounted to and detached from the vehicle body in a mutually assembled state, so that the mountability and detachability of them can be easily enhanced.

In addition, since the rear fender 87 supported by the license plate stay 81 is provided and the license plate 80 is attached to the rear fender 87, the license plate stay 81 can be utilized also as a stay for the rear fender 87. Therefore, the number of component parts can be reduced, which also facilitates enhancement of appearance quality in the periphery of the license plate 80.

Moreover, since the caliper bracket 73 is located above the axle 13J of the rear wheel 13, the distance from the caliper bracket 73 to the support position of the license plate 80 can be shortened, and the length of the license plate stay 81 can be reduced. Therefore, an advantage from the viewpoint of reductions in the size and weight of component parts is obtained.

Besides, since the rear wheel brake caliper 72 is located on the upper side of the swing arm 28 in side view of the vehicle body, a vacant space on the upper side of the swing arm 28 can be used as a caliper space. Therefore, the caliper can be efficiently disposed in the saddle riding vehicle 10 which is limited in space for disposing members.

In addition, since the rear edge 76S of the caliper bracket 73 and the rear edge 83S of the license plate stay 81 are continuous with each other in side view of the vehicle body, the caliper bracket 73 and the license plate stay 81 can be easily integrated in external appearance, so that appearance quality is enhanced.

Further, since the front edge 76F of the caliper bracket 73 and the front edge 82F of the license plate stay 81 are continuous with each other in side view of the vehicle body, the caliper bracket 73 and the license plate stay 81 can be easily integrated in external appearance also thereby, so that appearance quality is enhanced.

Besides, the through-hole 77 is provided between the rear edge 76S and the front edge 76F of the caliper bracket 73, and the wheel speed sensor 92 is fixed to the caliper bracket 73 in such a manner as to overlap with the through-hole 77 provided in the caliper bracket 73. As a result, the wheel speed sensor 90 can be held by utilizing the caliper bracket 73 located above the axle 13J, and the wheel speed sensor 90 can detect the rotation of the pulser ring 91 through effective utilization of the through-hole 77 provided in the caliper bracket 73. Therefore, the wheel speed sensor 90 can be efficiently disposed in the saddle riding vehicle 10 which is limited in space for disposing members.

In addition, since the license plate stay 81 is Y-shaped in side view of the vehicle body, the caliper bracket 73 is lightened on the inner side, so that reductions in weight and cost can be easily achieved.

The aforementioned embodiment is merely an embodiment of the present invention, and arbitrary modifications and applications are possible without departing from the gist of the present invention.

For instance, while a case of applying the present invention to the saddle riding vehicle 10 depicted in FIG. 1 has been described in the above embodiment, this is not limitative, and the present invention may be applied to a two-wheeled motor vehicle and various saddle riding vehicles such as three-wheeled or four-wheeled vehicles such as ATVs (all terrain vehicles).

DESCRIPTION OF REFERENCE SYMBOLS

10 Saddle riding vehicle
12 Front wheel
13 Rear wheel
13J Axle
15 Power unit
21 Body frame
23 Front frame section
23A Steering shaft support section
24 Power unit support frame
25 Pivot frame
26 Steering shaft
27 Handle
28 Swing arm
29 Pivot shaft
38 Radiator
39 Radiator shroud
39B Rear edge of radiator shroud
41 Accommodation box
41K Opening
42 Box main body
51 Cover
51F Front edge of cover
51B Rear edge of cover
51S Lower edge of cover
51U Upper edge of cover
51BS Rear edge lower portion of cover (First inclination section)
51BU Rear edge upper portion of cover (Third inclination section)
51FS Front edge lower portion of cover (Second inclination section)
51FU Front edge upper portion of cover
52 Support shaft
61 Resin frame
61A Front-side resin frame section
61B Rear-side resin frame section
61B1 Seat section
61B2 Rear section
63, 85 Fastening member
71 Brake disc
72 Rear wheel brake caliper
73 Caliper bracket
74 Caliper support section
76 Stay support section
76F Front edge of stay support section (Front edge of caliper bracket)
76S Rear edge of stay support section (Rear edge of caliper bracket)
80 License plate
81 License plate stay
82F Front edge of license plate stay
83S Rear edge of license plate stay
87 Rear fender
88 License plate bracket

The invention claimed is:

1. A saddle riding vehicle comprising:
   a swing arm that supports a rear wheel; and
   a caliper bracket that is supported together with the rear wheel and that supports a rear wheel brake caliper,
   wherein the caliper bracket supports a license plate stay to which a license plate is to be attached;
   a rear fender, which is supported by the license plate stay and to which the license olate is to be attached; and,
   wherein the caliper bracket is located above an axle of the rear wheel.

2. The saddle riding vehicle according to claim 1, wherein the rear wheel brake caliper is located on an upper side of the swing arm in side view of a vehicle body.

3. The saddle riding vehicle according to claim 1, wherein a rear edge of the caliper bracket and a rear edge of the license plate stay are continuous with each other in side view of a vehicle body.

4. The saddle riding vehicle according to claim 1, wherein a front edge of the caliper bracket and a front edge of the license plate stay are continuous with each other in side view of a vehicle body.

5. The saddle riding vehicle according to claim 1,
   wherein a through-hole is provided between a rear edge and a front edge of the caliper bracket, and
   a wheel speed sensor that detects speed of the rear wheel is fixed to the caliper bracket in such a manner as to overlap with the through-hole.

6. The saddle riding vehicle according to claim 1, wherein the license plate stay is Y-shaped in side view of a vehicle body.

7. The saddle riding vehicle according to claim 1, comprising:
   a pivot frame that rotatably supports a front end of the swing arm; and
   a resin frame extending in a longitudinal vehicle direction while passing on an upper side of the pivot frame,
   wherein the pivot frame and the resin frame are fastened together by a fastening member penetrating the pivot frame and the resin frame in a vertical direction.

8. A saddle riding vehicle comprising:
a swing arm that supports a rear wheel; and
a caliper bracket that is supported together with the rear wheel and that supports a rear wheel brake caliper,
wherein the caliper bracket supports a license plate stay to which a license plate is to be attached;
wherein a through-hole is provided between a rear edge and a front edge of the caliper bracket, and
a wheel speed sensor that detects speed of the rear wheel is fixed to the caliper bracket in such a manner as to overlap with the through-hole.

9. A saddle riding vehicle comprising:
a swing arm that supports a rear wheel;
a caliper bracket that is supported together with the rear wheel and that supports a rear wheel brake caliper,
a pivot frame that rotatably supports a front end of the swing arm; and
a resin frame extending in a longitudinal vehicle direction while passing on an upper side of the pivot frame, wherein the pivot frame and the resin frame are fastened together by a fastening member penetrating the pivot frame and the resin frame in a vertical direction
wherein the caliper bracket supports a license plate stay to which a license plate is to be attached.

* * * * *